US007643853B2

(12) United States Patent
Knudsen et al.

(10) Patent No.: US 7,643,853 B2
(45) Date of Patent: Jan. 5, 2010

(54) APPARATUS AND METHOD FOR SELECTING AN ANTENNA IN A COMMUNICATION SYSTEM

(75) Inventors: Mikael Bergholz Knudsen, Aalborg (DK); Gert Frølund Pedersen, Aalborg (DK); Patrick Claus Friedrich Eggers, Aalborg (DK); Do-Young Kim, Yongin-si (KR); Marcos Daniel Katz, Suwon-si (KR); Sung-Kwon Hong, Seoul (KR); Young-Kwon Cho, Suwon-si (KR); Chan-Byoung Chae, Seoul (KR); Geun-Ho Lee, Seoul (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 508 days.

(21) Appl. No.: 11/511,000

(22) Filed: Aug. 28, 2006

(65) Prior Publication Data

US 2007/0066361 A1 Mar. 22, 2007

(30) Foreign Application Priority Data

Aug. 27, 2005 (KR) ..................... 10-2005-0079147

(51) Int. Cl.
*H04B 1/36* (2006.01)

(52) U.S. Cl. ................................ 455/562.1; 455/277.1

(58) Field of Classification Search .................. 455/78, 455/80, 90.1, 550.1, 552.1, 553.1, 561, 562.1, 455/277.1

See application file for complete search history.

(56) References Cited

U.S. PATENT DOCUMENTS 6,442,375 B1 * 8/2002 Parmentier .................. 455/78
7,251,499 B2 * 7/2007 Ella et al. ................ 455/552.1
2003/0069036 A1 * 4/2003 Forrester .................... 455/552

FOREIGN PATENT DOCUMENTS

KR 1020050056032 6/2005

* cited by examiner

*Primary Examiner*—Thanh C Le
(74) *Attorney, Agent, or Firm*—The Farrell Law Firm, LLP

(57) ABSTRACT

An apparatus and a method for selecting an antenna appropriate for a data service type in a communication system employing multiple antennas. The method of performing data communication through a transceiver using multiple antennas includes determining the type of the data services contained in a received signal, selecting one of the multiple antennas with a communication quality corresponding to the type of the data services, and employing the selected antenna to perform the data communication.

9 Claims, 5 Drawing Sheets

APPARATUS AND METHOD FOR SELECTING AN ANTENNA IN A COMMUNICATION SYSTEM

PRIORITY

This application claims priority under 35 U.S.C. § 119 to an application filed in the Korean Intellectual Property Office on Aug. 27, 2005 and assigned Ser. No. 2005-79147, the contents of which are incorporated herein by reference.

BACKGROUND OF THE INVENTION

1. Field of the Invention

The present invention relates to an antenna structure provided in a communication system, and more particularly to an apparatus for enabling an antenna structure to effectively work for various data services in a data communication system and a method therefore.

2. Description of the Related Art

Generally the performance and capacity of a communication system are adversely affected by radio channel characteristics such as same channel signal interference, path loss, multiple path fading, signal delay, Doppler diffusion, and shading phenomenon occurring in a cell and between cells. In order to mitigate these drawbacks, various technologies like power control, channel coding, rake reception, diversity antenna, cell sectoring, frequency division, and/or band diffusion are typically used by communication systems.

However, conventional technologies have difficulty satisfying increasing data communication needs of users and providing high performance and high capacity data communication services. The high performance data communication systems typically include communication systems which can transmit a large amount of data packets such as a moving picture. Accordingly communication systems have been developed to support multimedia communications requiring high quality and high capacity.

Generally the communications systems include a base station and at least a subscriber terminal to provide communication services. The base station exchanges high frequency signals with the subscriber's terminal through one or more antennas. The antennas used for the subscriber's terminals may include directional, omni-directional, monopole, or dipole-type antennas.

The monopole-type antenna is typically used in the subscriber terminal cannot have a gain for a signal portion of horizontal polarization even though the received signal includes both signal portions of horizontal and vertical polarization. On the contrary, the antenna system utilizing both horizontal and vertical polarization such as helical antenna has a high gain because of good signal receptivity.

Although the next generation communication systems are being designed to provide subscriber terminals with various data services, the position of the antenna in the subscriber terminal and other adjacent devices may adversely affect the signal reception. For example, if the user uses game services on the subscriber terminal (which typically require the user to hold the terminal using one or both hands, the user's hand may obstruct the incoming radio waves depending on the position of the antenna in the terminal relative to the user's hand or hands, thereby weakening the signal strength. Hence, the position or direction of the antenna in the subscriber's terminal must be considered in order to effectively receive various data services without weakening the signal strength. To this end, efforts have been made to adapt multiple antennas in the subscriber terminals to effectively receive various high-quality data communication services.

SUMMARY OF THE INVENTION

It is an object of the present invention to provide an apparatus and method for selectively controlling an antenna arrangement installed in a communication system according to a type of data service(s) received.

It is another object of the present invention to provide an apparatus for selecting one of multiple antennas installed in a communication system that is appropriate for the type of data communication service(s) and a method therefore.

It is still another object of the present invention to provide an apparatus for selecting one of multiple antennas installed in a communication system that enhances diversity or multiplexing effects, and a method therefor.

It is further another object of the present invention to provide an apparatus for selecting one of multiple antennas installed in a subscriber terminal that works at a different frequency from the others to receive data communication services from a communication system at that frequency, and a method therefor.

It is a further object of the present invention to provide an apparatus for selecting one of multiple antennas installed in a subscriber terminal that may utilize a polarization effect at maximum by arranging the antennas so as to receive both vertical and horizontal polarization at the same time, and a method therefor.

According to an aspect of the present invention, a method of performing data communication through a transceiver using multiple antennas, includes determining the type of the data services contained in a received signal, selecting one of the multiple antennas with a communication quality corresponding to the type of the data services contained in the received signal, and employing the selected one of the multiple antennas to perform the data communication.

According to another aspect of the present invention, an apparatus for receiving various data services in a data communication system, includes a higher layer block for generating higher layer information to indicate one or more types of the data services received, and an antenna selection device for selecting one or more of multiple antennas with a communication quality appropriate for the one or more types of the data services received by performing an antenna control algorithm according to the higher layer information.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
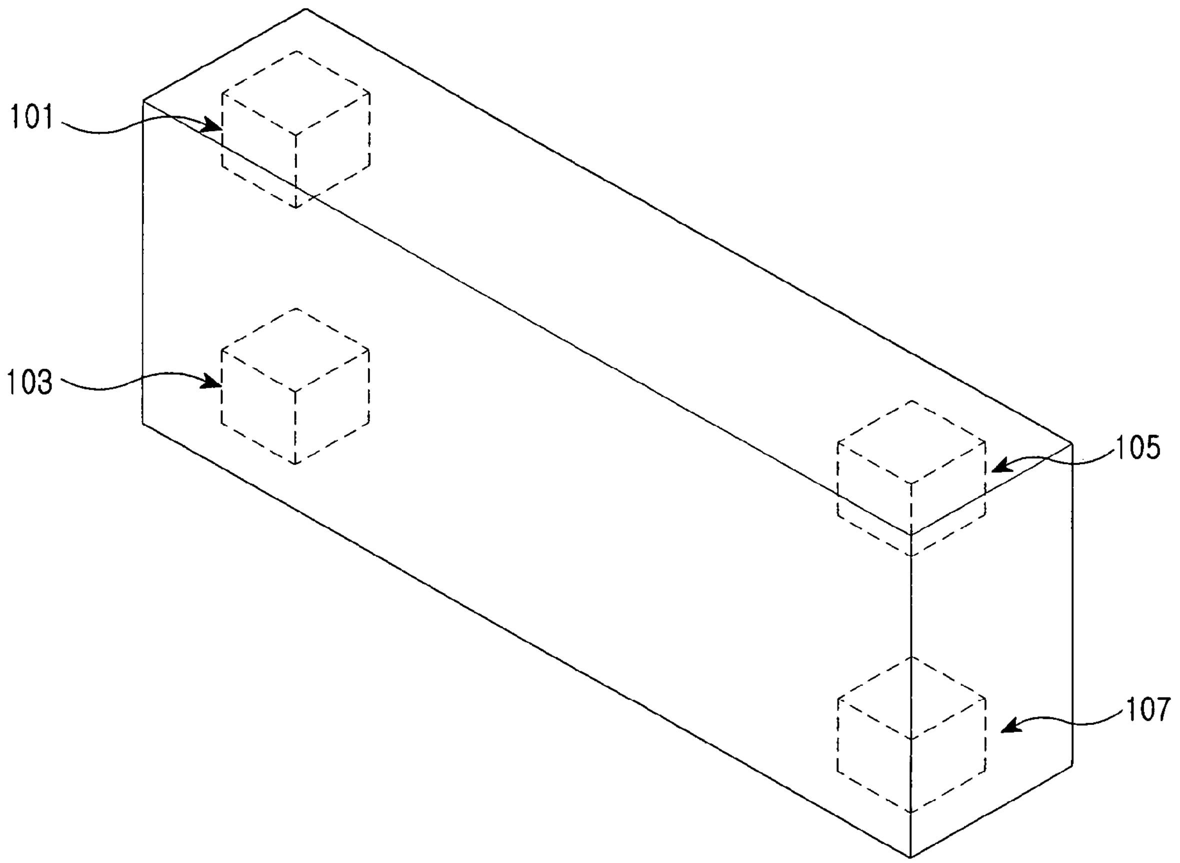
FIG. 1 is a perspective view illustration of an antenna structure including four antennas according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention provides an apparatus for selecting one of multiple antennas installed in a communication system providing various data services that is appropriate for the type of data services being transmitted, and a method therefor. The present invention is also directed to an apparatus for selecting one of multiple antennas installed in a subscriber terminal that is appropriate for the type of data services transmitted using a multiple antenna transmission technology using cross-layer antenna diversity through the signal link between a higher and a lower layer, and a method therefor.

The invention provides a subscriber terminal with multiple antennas that may be selectively operated so as to obtain a desired communication quality when transmitting data to and/or from the base station. Namely, the subscriber terminal selects at least one antenna among the multiple antennas that has a communication quality appropriate for (i.e., corresponding to) the type of data services provided by the base station. More specifically, the subscriber terminal selects an antenna that may provide the best communication quality for the type of the services presently provided from the base station, which may, for example, include voice communication, game, multimedia, music, and/or character message based information. In this case, the communication qualities of the antennas for such varieties of data services are classified experimentally, and set as predetermined values agreed between the subscriber's terminal and the base station. Thus the invention enables the subscriber's terminal to adapt the antenna system for the data services type, and can provide the communication services having a desired quality to the user.

The method of selecting one of the multiple antennas includes using the statistical information corresponding to the quality of each type of data services as described above. In this case, the type of data services provided by the base station may be determined based on the higher layer information delivered from a higher layer such as Medium Access Control (MAC) layer. Namely, the data services, whether they be video services or voice communication services, are generally not changed when they are performed. Hence, the data services type may be determined by a higher layer and may be delivered as higher layer information, such as higher level protocols, so that the subscriber terminal may select an antenna appropriate for the data services type. There are various types of the higher layer information, which will be described hereinafter.

The subscriber terminal includes an antenna system capable of working at different frequency bands so that the subscriber terminal may receive data services provided at different frequencies. The inventive antenna system may also include both horizontal and vertical polarization effects corresponding to various data services. Thus, the antenna system brings about various antenna effects by performing an algorithm applying diversity or multiplexing. Thus, the subscriber terminal may select an antenna appropriate for the frequency band and/or central frequency of the data services type, so that the user may enjoy various data services.

FIG. 1 is a perspective view illustration of an antenna structure including four antennas according to the present invention.

Referring to FIG. 1, the antenna system includes four monopole antennas A 101, B 103, C 105 and D 107. Of course, any kind of the types of antennas as are typically used in a communication systems may replace the monopole antenna. It will also be noted that the number and types of the antennas may be varied as desired.

Figure 2A:
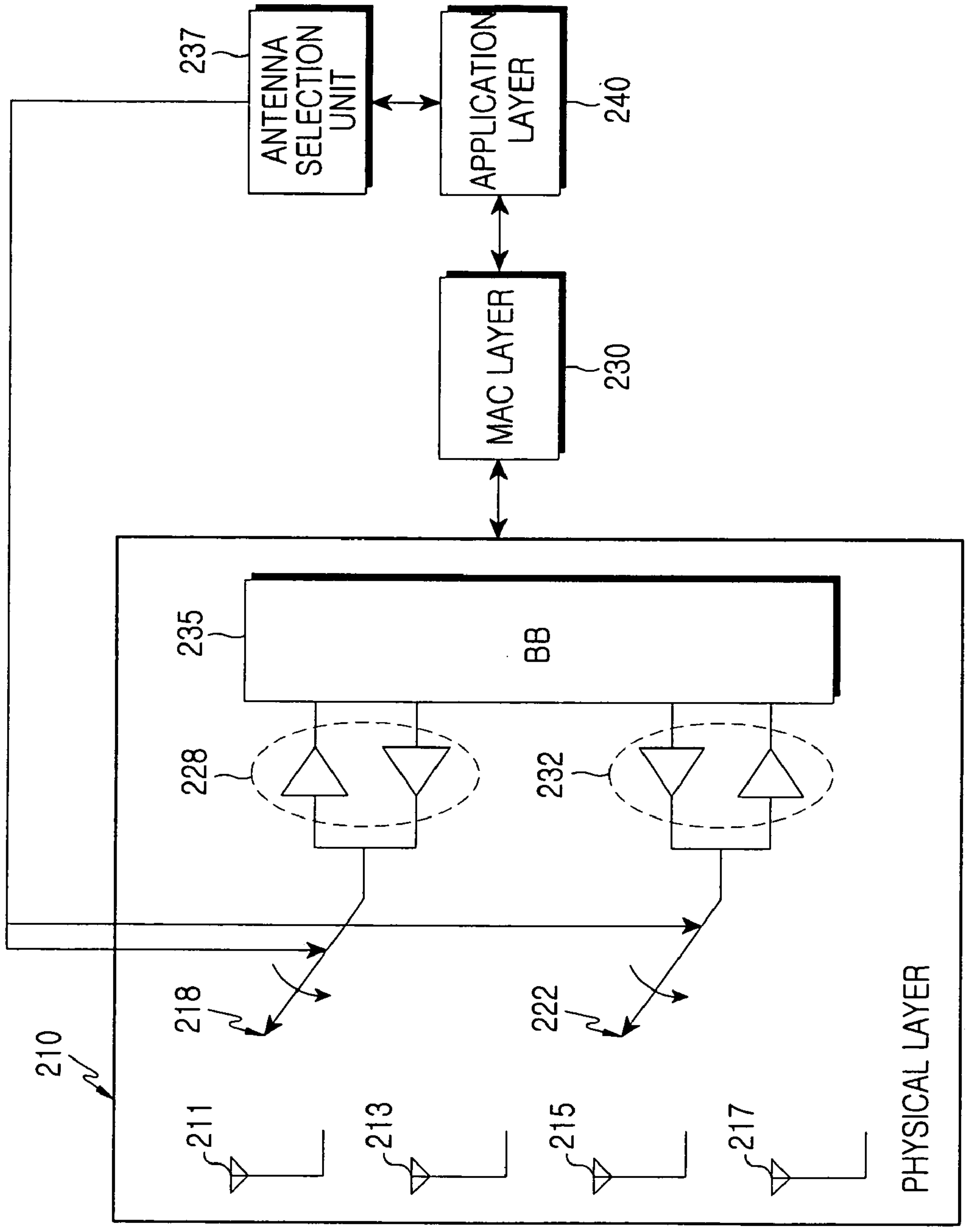
FIGS. 2A and 2B are block diagrams for illustrating an apparatus for selecting one of multiple antennas arranged according to the present invention.
Figure 2B:
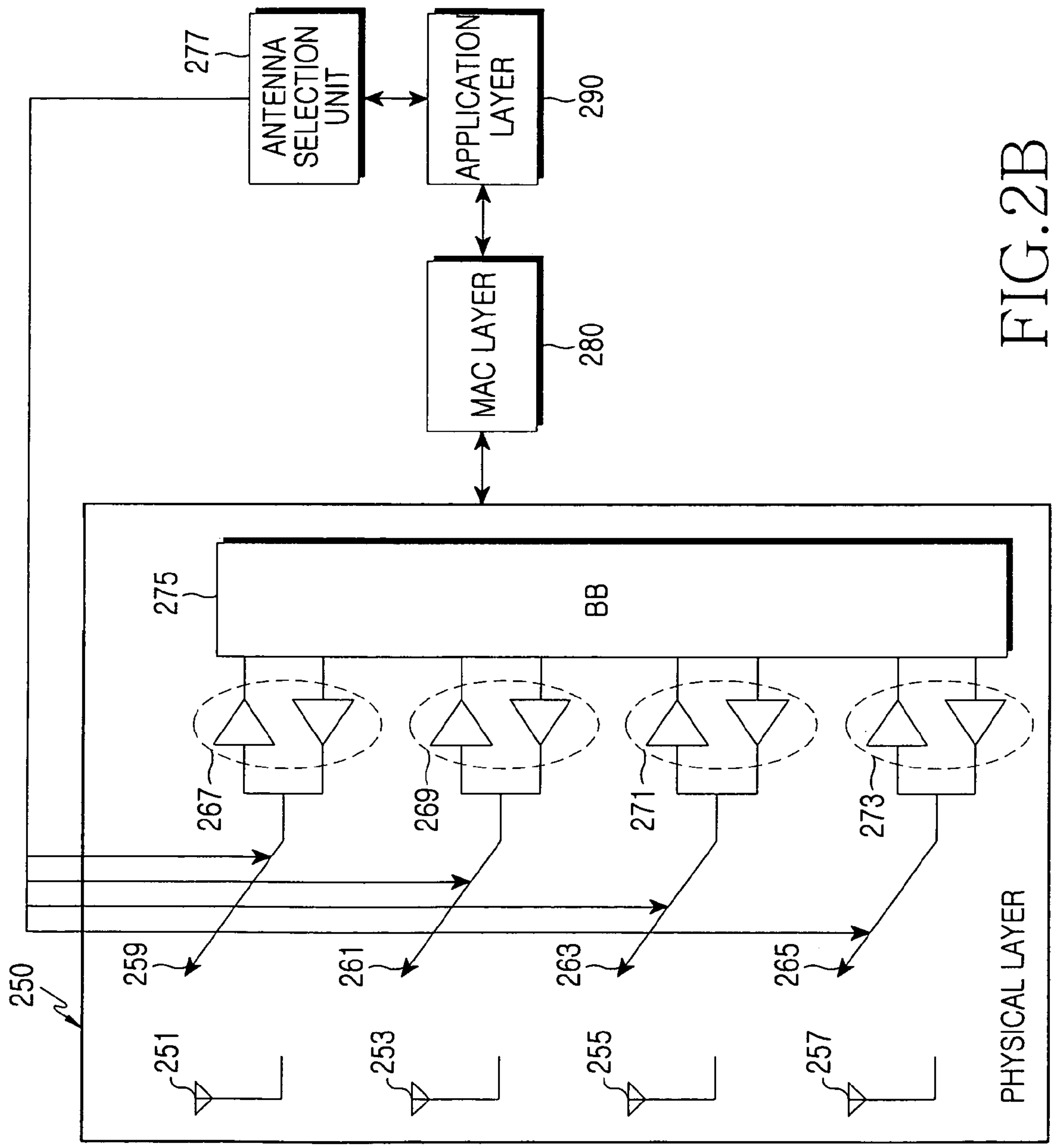

FIGS. 2A and 2B are block diagrams for illustrating an apparatus for selecting one of multiple antennas arranged according to the present invention.

As shown in FIGS. 2A and 2B, the antenna system also includes a physical layer 210, MAC layer 230, and an application layer 240, multiple switches (i.e., 218 and 222), multiple transceivers (e.g., 228 and 232) and algorithm selection blocks.

As shown, the apparatus for selecting an antenna may include the four antennas 211, 213, 215, and 217, the two switches 218 and 222, the two transceivers 228 and 232, a baseband board (BB) 235 for treating signals transmitted and/or received, an antenna selection unit 237, and higher layer blocks of MAC 230 and application layer 240, as shown in FIG. 2A. The two transceivers 228 and 232 are arranged so as to be connected with one or two of the four antennas 211, 213, 215 and 217 by means of the switches 218 and 222 under the control of the antenna selection unit 237. In this case, the antenna selection unit 237 selects the antenna based on the higher layer information received from the MAC layer 230 and application layer 240. Namely, the MAC layer 230 and application layer 240 serve to determine the type and transmission band or central frequency of the data services received from the base station, delivering the result as the higher layer information to the antenna selection unit 237. Then the signals received through the two transceivers 228 and 232 are combined by the baseband board 235 through the conventional diversity procedure such as MRC (Maximal Ratio Combining).

Although an antenna system including four antennas and two transceivers is shown in FIG. 2A, the antenna system may include, for example, multiple antennas and a single transceiver so that a single optimum antenna may be selected without combining several signals. The antenna system may also include multiple antennas and the same number of transceivers, whereby combination of several signals or selection of a single optimum antenna or performing one or more data services at the same time may be performed by optimum antenna's selection respectively. Hereinafter, for the sake of clarity, the antenna system according to the present invention will include four antennas and four transceivers.

Referring to FIG. 2B, the antenna selection apparatus includes four antennas 251, 253, 255, and 257, four switches 259, 261, 263, and 265, four transceivers 267, 269, 271, and 273, a baseband board BB 275, an antenna selection unit 277, and higher layer blocks of MAC layer 280 and application layer 290. The four antennas 251, 253, 255, and 257 and four transceivers 267, 269, 271, and 273 may be arranged so that at least one antenna may be connected with the corresponding transceiver by means of the switches 259, 261, 263, and 265 under the control of the antenna selection unit 277. Namely one or more antennas may be connected with their respective transceivers under the control of the antenna selection unit 277. In this case, the antenna selection unit 277 performs the antenna selection based on the higher layer information delivered by the MAC layer 280 and application layer 290. Namely, the MAC layer 280 and application layer 290 serve to determine the type and transmission band or central frequency of the data services received from the base station, delivering the result as the higher layer information to the antenna selection unit 277. Then the signals received through the four transceivers 267, 269, 271 and 273 are combined by the baseband board 275 through a procedure such as MRC.

Referring to Equation 1, the antenna selection method selects an antenna from the antenna elements $S_1, \ldots, S_j$ having the highest value. The weight factors $S_{ji}$ are obtained from a lookup table defined previously in the system. The lookup table is as shown in Table 1.

TABLE 1

| | | Sj | | | | | | | |
|---|---|---|---|---|---|---|---|---|---|
| Antenna | Si | A Hor | A Ver | B Hor | B Ver | C Hor | C Ver | D Hor | D Ver |
| Type of service | Talk | 0.7 | 0.7 | 0.7 | 0.7 | 1.3 | 1.3 | 1.3 | 1.3 |
| | Video | 2.0 | 2.0 | 2.0 | 2.0 | 0.5 | 0.5 | 0.5 | 0.5 |
| | MP3 | 0.9 | 0.9 | 0.9 | 0.9 | 1.1 | 1.1 | 1.1 | 1.1 |
| Key Press | ‘0’ | 1.0 | 1.0 | 1.0 | 1.0 | 0.8 | 0.8 | 0.8 | 0.8 |
| | ‘1’ | 1.0 | 1.0 | 1.0 | 1.0 | 0.4 | 0.4 | 0.9 | 0.9 |
| | ‘2’ | 1.0 | 1.0 | 1.0 | 1.0 | 0.8 | 0.8 | 0.8 | 0.8 |
| | ‘3’ | 1.0 | 1.0 | 1.0 | 1.0 | 0.9 | 0.9 | 0.4 | 0.4 |
| | ‘4’ | 1.0 | 1.0 | 1.0 | 1.0 | 0.4 | 0.4 | 0.9 | 0.9 |
| | ‘5’ | 1.0 | 1.0 | 1.0 | 1.0 | 0.8 | 0.8 | 0.8 | 0.8 |
| | ‘6’ | 1.0 | 1.0 | 1.0 | 1.0 | 0.9 | 0.9 | 0.4 | 0.4 |
| | ‘7’ | 1.0 | 1.0 | 1.0 | 1.0 | 0.4 | 0.4 | 0.9 | 0.9 |
| | ‘8’ | 1.0 | 1.0 | 1.0 | 1.0 | 0.8 | 0.8 | 0.8 | 0.8 |
| | ‘9’ | 1.0 | 1.0 | 1.0 | 1.0 | 0.9 | 0.9 | 0.4 | 0.4 |
| | ‘Navigator’ | 0.8 | 0.8 | 0.8 | 0.8 | 1.0 | 1.0 | 1.0 | 1.0 |
| Compass/GPS | 0°-90° | 1.5 | 1.5 | 1.0 | 1.0 | 0.5 | 0.5 | 1.0 | 1.0 |
| Orientation | 90°-180° | 1.0 | 1.0 | 1.5 | 1.5 | 1.0 | 1.0 | 0.5 | 0.5 |
| relative to BS | 180°-270° | 0.5 | 0.5 | 1.0 | 1.0 | 1.5 | 1.5 | 1.0 | 1.0 |
| | 270°-360° | 1.0 | 1.0 | 0.5 | 0.5 | 1.0 | 1.0 | 1.5 | 1.5 |
| Horizontal or | Horizontal | 2.0 | 0.5 | 2.0 | 0.5 | 2.0 | 0.5 | 2.0 | 0.5 |
| vertical orientation | Vertical | 0.5 | 2.0 | 0.5 | 2.0 | 0.5 | 2.0 | 0.5 | 2.0 |
| Switch setting | Car | 1.0 | 1.0 | 1.0 | 1.0 | 0.5 | 0.5 | 0.5 | 0.5 |
| | Flip status | 0.5 | 0.5 | 0.5 | 0.5 | 1.0 | 1.0 | 1.0 | 1.0 |
| | Headset | 1.0 | 1.0 | 0.5 | 0.5 | 0.5 | 0.5 | 1.0 | 1.0 |

The antennas may be directional antennas, omni-directional antennas, and/or have different polarizations. Thus, the antenna system may operate one or more of an horizontal and/or vertical antenna according to the data services type or its central frequency exchanged between the base station and the subscriber terminal, thereby reducing loss due to the antenna polarization. Namely, the inventive antenna system selects an optimum antenna which is appropriate for the data services type provided for the subscriber terminal, and the selected antenna is controlled so as to work as a horizontal or vertical polarized antenna according to the communication environment. For example, a horizontal and/or a vertical polarized antenna dependent upon whether the data services type is horizontal or vertical, thereby minimizing the polarization loss.

Hereinafter is more specifically described the method of selecting an antenna. First, the antenna elements are allotted with respective weight factors S, which are the values predetermined for the items containing the higher layer information. The weight factor is calculated for each of the antenna elements as represented by the following Equation 1:

$$S = \begin{bmatrix} S_1 \\ S_2 \\ \vdots \\ S_j \end{bmatrix} = \begin{bmatrix} S_{11} & \cdot S_{12} & \cdots & S_{1i} \\ S_{21} & \cdot S_{22} & \cdots & S_{2i} \\ & \vdots & & \\ S_{j1} & \cdot S_{j2} & \cdots & S_{ji} \end{bmatrix} \tag{1}$$

Wherein the symbol S represents the weight factor predetermined by the system, and the first subscription j of each weight factor element $S_{ji}$ the antenna element, and the second subscription i the information type of the data services.

Table 1 is an example of the lookup table for the weight factors $S_{ji}$ used in an antenna selection algorithm according to Equation 1. In this Table 1, the Type of Service represents the types of the data services provided for the subscriber. Namely the service type represents the data services exchanged between the base station and the subscriber terminal such as talk services, voice communication services, video services, game services, music services like MP3, SMS (Short Message Services), photographic and corresponding image transmission services, GPS services, and Internet services. The service's type refers to a value agreed to between the base station and the subscriber's terminal, so that the subscriber terminal may recognize the data service's type received from the base station so as to select the antenna appropriate for the data service's type with reference to Table 1.

The Key Press represents the values input through keys and/or a touch-sensitive display device provided in the subscriber terminal, i.e., the user's entering information generated by pressing the keys such as the buttons numbered respectively 0 to 9 of the numeric keypad or the event keys such as navigator. Namely, the user may arbitrarily select the optimum antenna. In this case, the keys including the buttons of the numeric keypad are mapped with respective data service's types or with the handling information of the antennas. For example, if the user "0" representing the talk services, the subscriber terminal selects the antenna corresponding to the number 0 to perform the data communication with the base station.

The Compass/GPS Orientation is the field which is used to select the optimum antenna appropriate for the information relating to the base station such as the phase angle in order to perform the compass/GPS function. The field enables the subscriber terminal to select the optimum antenna according to the directional and omni-directional characteristics of the antennas.

The Switch Setting is the field which is used to select an antenna according to the values set by the switches provided in the subscriber terminal. For example, the terminal may set a connection with a vehicle such as hands-free connection, connection with a headset, and the flip state such as flip opened or closed. Thus according to the switch setting state such as the value for connecting with a vehicle, the subscriber terminal selects the optimum antenna to obtain desirable communication quality. Besides the subscriber terminal may include sensors such as optical and/or metallic sensors provided on an exterior location of the subscriber terminal to enable selection of the optimum antenna, thus providing desirable communication quality. Of course, the antenna selection method is not limited to the statistical user's data services types as described above.

The antenna selection method may be accomplished according to the control information format or frame head agreed between the base station and the subscriber's terminal. More specifically, the subscriber terminal first determines the data services type by reading the information in the data format of the base station. This determination is performed in the higher layer of the subscriber terminal. Namely, the antenna selection is accomplished by first selecting the information type $S_i$ and then $S_j$ to determine $S_{ji}$ by referring to the weight factors as shown in Table 1. Hereinafter, the operation corresponding to the structure shown in FIG. 1 and Table 1, will be described. Firstly, for the sake of clarity, an arbitrary data services type "Talk" will be selected as an example.

Example of Data Services Type "Talk"

If the base station transmits predetermined control information to the subscriber terminal, the subscriber terminal recognizes the data services type as "Talk" based on the control information represented in Table 1. More specifically, the subscriber terminal determines the control information in the higher layer so as to generate the higher layer information delivered to the antenna selection unit. Then the subscriber terminal selects $S_i$ representing the services type "Talk" from Table 1, and the corresponding antenna. Hereinafter the service's type "Talk" is referred to as $S_1$. Then the subscriber terminal recognizes $S_1$ by reading the higher layer information, and finds the antenna element $S_j$ corresponding to $S_1$ by referring to Table 1. Namely the subscriber terminal selects the antenna corresponding to $S_j$ allotted therefor. The weight factor for each antenna is prescribed in the lookup table shown in Table 1.

For example, the antennas 101 and 103 as shown in FIG. 1 are allotted with a weight factor of 0.7 by considering the horizontal and vertical directionality, and the antennas 105 and 107 with a weight factor of 1.3. Thus, the subscriber terminal determines the antenna appropriate for the data service's type "Talk". Next, the data services type "GPS" is selected as another example.

Example of Data Services Type "GPS"

If the base station transmits predetermined control information to the subscriber terminal, the subscriber terminal recognizes the data service's type as "GPS" based on the control information represented in Table 1. More specifically the subscriber terminal determines the control information in the higher layer so as to generate the higher layer information delivered to the antenna selection unit. Then the subscriber terminal selects $S_i$ representing the services type "GPS" from Table 1, and the corresponding antenna.

In this case, the angular information for each antenna of the subscriber terminal is selected as $S_i$ according to the predetermined directionality based on the receiving power of the largest value when receiving the control information. Then the subscriber terminal finds the antenna element $S_j$ corresponding to $S_i$ by referring to Table 1. Namely, the subscriber terminal selects the antenna corresponding to $S_j$ allotted therefor. The weight factor for each antenna is prescribed in the lookup table shown in Table 1.

For example, the antennas 101 and 103 as shown in FIG. 1 are allotted with respective weight factors of 1.5, 1.5, 1.0, and 1.0 by considering the horizontal and vertical directionality, and the antennas 105 and 107 with respective weight factors of 0.5, 0.5, 1.0, and 1.0. Thus, the subscriber terminal determines the antenna appropriate for the data services type of "GPS".

Figure 3:
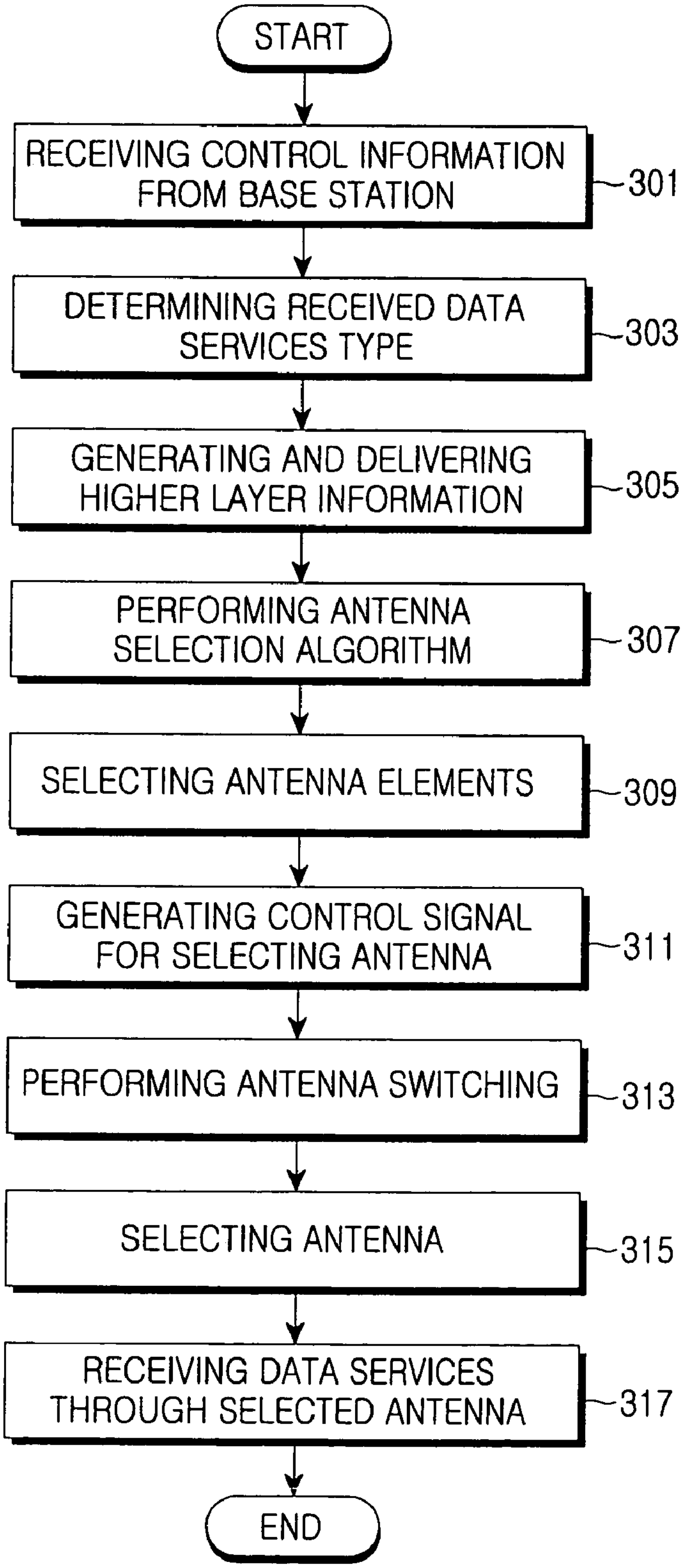
FIG. 3 is a flowchart illustrating a method for receiving data through an antenna selected according to the type of data services being transmitted according to the present invention.

Referring to FIG. 3, upon receiving the control information from the base station in step 301, the subscriber terminal determines the received data service's type in the higher layer in step 303. Then the higher layer generates the higher layer information to notify the antenna selection device of the determined service's type in step 305. The antenna selection device performs the antenna selection algorithm for providing good quality data services in response to the higher layer information in step 307, so as to select the antenna elements appropriate for the data service's type in step 309.

Then the terminal generates a control signal for selecting the antenna corresponding to the antenna elements in step 311. Subsequently the subscriber terminal performs the switching operation for selecting the antenna in response to the control signal in step 313, so that the optimum antenna appropriate for the service's type is selected in step 315. Finally, the terminal receives the data services from the base station through the selected antenna in step 317. Thus, the antenna system according to the present invention enables the subscriber's terminal to select the optimum antenna appropriate for the data services type provided by the base station, so that the terminal may perform data communication of high quality and high capacity with the base station.

Figure 4:
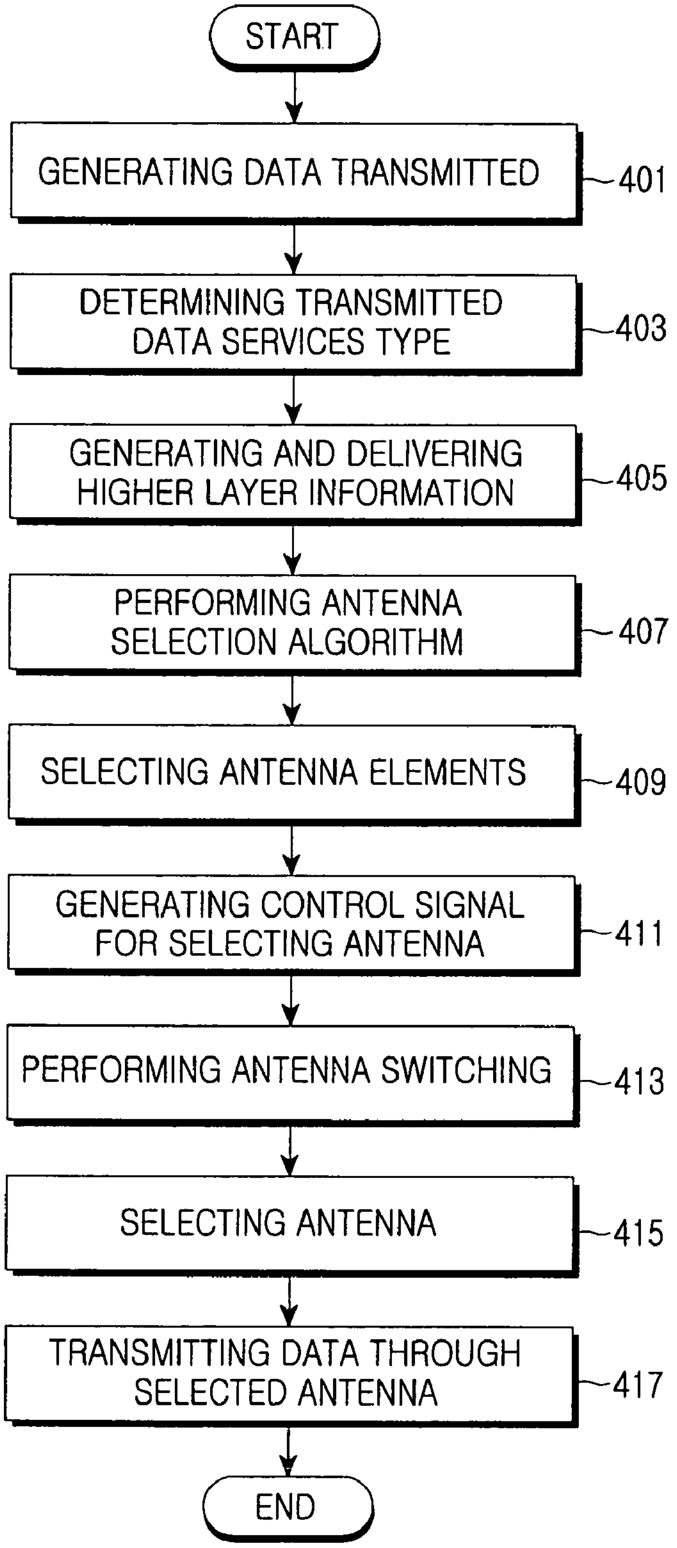
FIG. 4 is a flowchart illustrating a method for transmitting data through an antenna selected according to the type of data services being transmitted according to the present invention.

FIG. 4 is a flowchart illustrating a method for transmitting data through an antenna selected according to the type of data services being transmitted according to the present invention.

Hereinafter with reference to FIG. 4 a procedure of the selecting the antenna appropriate for transmitting data to the base station. Firstly, generating the data transmitted to the base station in step 401, the subscriber terminal enables the higher layer to determine the data service's type in step 403. Then, the higher layer generates the higher layer information to notify the antenna selection device in step 405. The antenna selection device performs the antenna selection algorithm for providing desired quality data services in response to the higher layer information in step 407, so as to select the antenna elements appropriate for the data services type in step 409.

Then the subscribed terminal generates a control signal for selecting the antenna corresponding to the antenna elements in step 411. Subsequently the subscriber performs the switching operation for selecting the antenna in response to the control signal in step 413, so that the optimum antenna appropriate for the service's type is selected in step 415. Finally the subscriber terminal transmits the data to the base station through the selected antenna in step 417. Thus, the antenna system according to the present invention enables the subscriber terminal to select the optimum antenna appropriate for the data services type provided by the base station.

As described above, the inventive antenna system includes multiple antennas provided in a subscriber terminal, so that the terminal may select the optimum antenna appropriate for the data service's type. To this end, the antenna selection algorithm employs the statistical information of the communication qualities to generate the higher layer information to notify the antenna selection device of the data service's type. It also considers the horizontal and the vertical polarization at the same time so as to receive data services employing both horizontal and vertical polarizations with increased the antenna gain. In addition, the invention enables the subscriber terminal to receive data services provided at different central frequencies through the antennas working at different frequency bands. Further, the inventive antenna system has both horizontal and vertical polarization effects for varieties of data services. Thus, the inventive antenna system brings about various antenna effects by performing an algorithm applying diversity or multiplexing.

While the invention has been shown and described with reference to a certain preferred embodiment thereof, it will be understood by those skilled in the art that various changes in form and details may be made therein without departing from the spirit and scope of the invention.

What is claimed is:

1. A method of performing data communication through a transceiver using multiple antennas, the method comprising the steps of:

determining a data service type of a received signal in a higher layer;

generating higher layer information including the data service type, and transmitting the higher layer information to an antenna selection device;

selecting at least one antenna corresponding to the data service type included in the higher layer information the multiple antennas among; and employing the selected at least one antenna to perform data communication of the data service type, wherein the antenna selection device performs an antenna selection algorithm to allot a weight factor for each antenna element according to the higher layer information, thereby selecting the at least one antenna having a large weight factor obtained from a predetermined lookup table, the look up table mappings a weight factor and a communication quality of an antenna corresponding to each data service type provided by a base station to a subscriber terminal.

2. The method as defined in claim 1, wherein the step of determining the service type determines use of a frame head exchanged between the base station and the subscriber terminal.

3. The method as defined in claim 1, wherein each of the multiple antennas includes different polarization.

4. The method as defined in claim 1, wherein the step of selecting at least one antenna includes:

determining a transmission frequency band of the data service type; and selecting at least one antenna corresponding to the transmission frequency band.

5. An apparatus using multiple antennas for performing data communication in a data communication in a data communication system, the apparatus comprising:

a higher layer block for generating higher layer information including service type of a received signal; and an antenna selection device for selecting at least one antenna corresponding to the service type included in the higher layer information from among the multiple antennas.

wherein the antenna selection device performs an antenna selection algorithm to allot a weight factor for each antenna element according to the higher layer information, the antenna selection device selects the at least one antenna having a large weight factor obtained from a predetermined lookup table, the lookup table maps a weight factor and a communication quality of an antenna corresponding to each data service type provided by a base station to a subscriber terminal.

6. The apparatus as defined in claim 5, wherein the higher layer block determines the data service type using a frame head exchanged between the base station and the subscriber terminal;

and informs the antenna selection device of the higher layer information corresponding to the data service type based on the determination.

7. The apparatus as defined in claim 5, further including at least one switch for switching to the at least one antenna selected by the antenna selection device according to the data service type, wherein the higher layer block recognizes a switching state of the subscriber terminal to inform the antenna selection device of the higher layer information corresponding to the switching state, and wherein the switching state represents a connection between the at least one switch and the at least one antenna.

8. The apparatus as defined in claim 5, wherein each of the multiple antennas includes at least one of different antenna characteristics and polarizations.

9. The apparatus as defined in claim 5, wherein the higher layer block determines the transmission frequency band of the data service type; and informs the antenna selection device of the higher layer information corresponding to the transmission frequency band based on the determination.

* * * * *

UNITED STATES PATENT AND TRADEMARK OFFICE

CERTIFICATE OF CORRECTION

PATENT NO. : 7,643,853 B2
APPLICATION NO. : 11/511000
DATED : January 5, 2010
INVENTOR(S) : Knudsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Sixteenth Day of November, 2010

David J. Kappos
*Director of the United States Patent and Trademark Office*